(12) United States Patent
Czajka, II et al.

(10) Patent No.: US 11,025,573 B1
(45) Date of Patent: Jun. 1, 2021

(54) METHOD AND APPARATUS FOR DATA SHARING

(71) Applicant: Ginko LLC, West Bloomfield, MI (US)

(72) Inventors: Ronald J. Czajka, II, Brighton, MI (US); Sam B. Attisha, West Bloomfield, MI (US)

(73) Assignee: Ginko LLC, West Bloomfield, MI (US)

( * ) Notice: Subject to any disclaimer, the term of this patent is extended or adjusted under 35 U.S.C. 154(b) by 193 days.

(21) Appl. No.: 16/212,902

(22) Filed: Dec. 7, 2018

Related U.S. Application Data

(63) Continuation-in-part of application No. 15/217,424, filed on Jul. 22, 2016, now Pat. No. 10,171,985.

(60) Provisional application No. 62/195,534, filed on Jul. 22, 2015, provisional application No. 62/234,246, filed on Sep. 29, 2015.

(51) Int. Cl.
| | |
|---|---|
| *G06F 3/048* | (2013.01) |
| *H04L 12/58* | (2006.01) |
| *H04L 29/12* | (2006.01) |
| *H04W 8/00* | (2009.01) |
| *H04L 29/08* | (2006.01) |
| *H04W 4/021* | (2018.01) |

(52) U.S. Cl.
CPC ............ *H04L 51/12* (2013.01); *H04L 51/20* (2013.01); *H04L 61/1547* (2013.01); *H04L 67/06* (2013.01); *H04L 67/306* (2013.01); *H04W 4/022* (2013.01); *H04W 8/005* (2013.01)

(58) Field of Classification Search
CPC ..... G06F 3/0484; G06F 3/0488; G06F 3/0482
See application file for complete search history.

(56) References Cited

U.S. PATENT DOCUMENTS

| | | | |
|---|---|---|---|
| 5,960,411 A | 9/1999 | Hartman et al. | |
| 6,694,353 B2 | 2/2004 | Sommerer | |
| 6,748,402 B1 | 6/2004 | Reeves et al. | |
| 6,785,367 B2 | 8/2004 | Horvath et al. | |
| 6,873,841 B1 | 3/2005 | Sagar | |
| 6,909,910 B2 | 6/2005 | Pappalardo et al. | |
| 7,194,419 B2 | 3/2007 | Robertson et al. | |
| 7,466,810 B1 * | 12/2008 | Quon ................ | H04M 3/42229 379/201.01 |

(Continued)

OTHER PUBLICATIONS

"SQL Profiles: Technical Overview" (Oracle, May 2010), 5 pgs.

*Primary Examiner* — Hua Lu
(74) *Attorney, Agent, or Firm* — Young Basile Hanlon & MacFarlane, P.C.

(57) ABSTRACT

A method for data sharing includes receiving, from a potential contact, a first location. The method also includes, in a case that a second location of a user device of a user matching the first location, identifying, for the user, the potential contact; receiving, from the user device, a request for the user to become a contact with the potential contact, the request includes a permission setting, the permission indicates whether a subset of user data of the user can be viewed by the potential contact; sending, based on the request, a communication to the potential contact to initiate a data exchange; and, in response to receiving an acceptance of the communication: setting the user as a contact of the potential contact, the subset of the user data is viewable to the potential contact in accordance with the permission; and setting the potential contact as a contact of the user.

31 Claims, 14 Drawing Sheets

(56) References Cited

U.S. PATENT DOCUMENTS

| | | |
|---|---|---|
| 7,606,725 B2 * | 10/2009 | Robertson .............. G06Q 10/02 |
| | | 705/7.11 |
| 7,634,509 B2 | 12/2009 | Onyon et al. |
| 7,680,513 B2 | 3/2010 | Haitani et al. |
| 8,588,386 B2 | 11/2013 | Isaacson et al. |
| 9,037,645 B2 * | 5/2015 | Czajka .................... H04L 67/42 |
| | | 709/203 |
| 10,217,085 B2 | 2/2019 | Castro et al. |
| 10,356,035 B1 * | 7/2019 | Gravino .................. H04N 21/4755 |
| 2005/0032527 A1 | 2/2005 | Sheha et al. |
| 2005/0091316 A1 | 4/2005 | Ponce et al. |
| 2007/0061567 A1 * | 3/2007 | Day ...................... H04L 9/3234 |
| | | 713/159 |
| 2008/0082332 A1 * | 4/2008 | Mallett ................... G10L 17/00 |
| | | 704/250 |
| 2008/0189387 A1 * | 8/2008 | Lee ........................ H04L 51/28 |
| | | 709/217 |
| 2009/0307281 A1 | 12/2009 | McCarthy et al. |
| 2010/0057481 A1 * | 3/2010 | Fein ....................... G06Q 30/02 |
| | | 705/1.1 |
| 2010/0088246 A1 | 4/2010 | Lim |
| 2010/0217614 A1 * | 8/2010 | Brown ................. H04L 67/1095 |
| | | 705/1.1 |
| 2010/0306185 A1 * | 12/2010 | Smith ............... G06F 16/24578 |
| | | 707/709 |
| 2011/0153553 A1 * | 6/2011 | Klotz .................... G06Q 50/01 |
| | | 707/607 |
| 2011/0202956 A1 * | 8/2011 | Connelly ........... H04N 21/4755 |
| | | 725/38 |
| 2012/0272287 A1 * | 10/2012 | Kuhlke ................. H04W 4/023 |
| | | 726/1 |
| 2012/0316962 A1 * | 12/2012 | Rathod ................ G06Q 10/107 |
| | | 705/14.54 |
| 2013/0185368 A1 * | 7/2013 | Nordstrom ............ H04W 4/023 |
| | | 709/206 |
| 2013/0219516 A1 * | 8/2013 | Shimshoni .............. H04L 63/08 |
| | | 726/28 |
| 2013/0298030 A1 * | 11/2013 | Nahumi .................. H04W 4/21 |
| | | 715/733 |
| 2014/0075075 A1 * | 3/2014 | Morrill ................. G06F 1/1632 |
| | | 710/303 |
| 2014/0101255 A1 * | 4/2014 | Pal ........................ G06Q 50/01 |
| | | 709/204 |
| 2014/0122220 A1 * | 5/2014 | Bradley ............. G06Q 30/0267 |
| | | 705/14.42 |
| 2014/0122605 A1 * | 5/2014 | Merom ................. G06Q 10/10 |
| | | 709/204 |
| 2014/0164129 A1 * | 6/2014 | Joshi .................. G06Q 30/0261 |
| | | 705/14.58 |
| 2014/0230030 A1 * | 8/2014 | Abhyanker ......... G06F 16/9537 |
| | | 726/6 |
| 2014/0244744 A1 | 8/2014 | Lyren |
| 2015/0120406 A1 * | 4/2015 | Ekberg ............... G06Q 30/0641 |
| | | 705/14.5 |
| 2015/0205842 A1 * | 7/2015 | Jain ...................... G06F 16/215 |
| | | 707/732 |
| 2015/0302098 A1 * | 10/2015 | Hern ....................... G06F 21/41 |
| | | 707/708 |
| 2015/0319157 A1 * | 11/2015 | Sherman ............. G06F 16/1844 |
| | | 726/7 |
| 2015/0319203 A1 * | 11/2015 | Jeremias ............ G06Q 30/0641 |
| | | 715/753 |
| 2016/0088139 A1 * | 3/2016 | Vance ................ H04M 1/27453 |
| | | 715/763 |
| 2016/0110467 A1 * | 4/2016 | Hern ....................... H04L 67/22 |
| | | 235/375 |
| 2016/0308685 A1 * | 10/2016 | Pujic ................. H04L 12/1818 |
| 2019/0347426 A1 * | 11/2019 | Coffing ................ H04L 63/104 |

* cited by examiner

METHOD AND APPARATUS FOR DATA SHARING

CROSS-REFERENCE TO RELATED APPLICATIONS

This application is a continuation-in-part of U.S. application Ser. No. 15/217,424, filed Jul. 22, 2016, which claims the benefit of U.S. Provisional Application Nos. 62/195,534, filed Jul. 22, 2015, and 62/234,246, filed Sep. 29, 2015, each of which is incorporated herein by reference in its entirety.

TECHNICAL FIELD

The present disclosure relates to data sharing, including sharing contact information, and determining potential candidates for data sharing between devices based on relative proximity of the devices.

BACKGROUND

Exchange of personal and professional contact information with another via business cards is on the decline, while digital contact information exchange is now trending. Social media tools are focused around an online forum rather than live meetings. There is a need for exchanging digital contact information immediately or upon request, such as in an impromptu situation or event, and for controlling future access to the exchanged information.

SUMMARY

A first aspect is a method for data sharing between devices in a network. The method includes identifying, for a user associated with a user device, a potential contact; receiving, from the user device of the user, a request for the user to become a contact with the potential contact; and sending, based on the request, a communication to the potential contact to initiate a data exchange. The user is associated with user data, and the potential contact is associated with contact data. The request includes a first permission setting, the first permission setting is at least a first value or a second value; the first value indicates that a subset of user data of a permitting user is to be shared with a permitted user; and the second value indicates that only chats are allowed from the permitted user to the permitting user. The method also includes, in response to receiving, from the potential contact, an acceptance of the communication, setting the user as a contact of the potential contact such that the subset of the user data is viewable to the potential contact in a case that the first permission setting being the first value; and setting the potential contact as a contact of the user.

A second aspect is a system for data sharing between devices in a network. The system includes a processor and a memory. The memory includes computer-executable instructions that, when executed by the processor, perform operations including identifying, for a user associated with a user device, a potential contact, the user is associated with user data, and the potential contact is associated with contact data; receiving, from the user device of the user, a request for the user to become a contact with the potential contact, the request includes a first permission setting, and the first permission setting is at least a first value that indicates that a subset of user data of a permitting user is to be shared with a permitted user; and sending, based on the request, a communication to the potential contact to initiate a data exchange. The operations also include, in response to receiving an acceptance of the communication, setting the user as a contact of the potential contact, the subset of the user data is viewable to the potential contact in a case that the first permission setting is the first value; and setting the potential contact as a contact of the user.

A third aspect is another method for data sharing between devices in a network. The method includes receiving, from a potential contact, a first location. The method also includes, in a case that a second location of a user device of a user matching the first location, identifying, for the user, the potential contact; receiving, from the user device, a request for the user to become a contact with the potential contact, the request includes a permission setting, the permission indicates whether a subset of user data of the user can be viewed by the potential contact; sending, based on the request, a communication to the potential contact to initiate a data exchange; and, in response to receiving an acceptance of the communication: setting the user as a contact of the potential contact, the subset of the user data is viewable to the potential contact in accordance with the permission; and setting the potential contact as a contact of the user.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Various aspects of this disclosure are now described with reference to the drawings. In the following description, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The present disclosure presents methods and apparatuses for detecting the proximity of contacts relative to a user and sharing contact information between the user and one or more detected contacts. A user of the disclosed method and apparatus, including without limitation computer readable instructions executable by the processing unit of the electronic device present disclosure (collectively, the "application"; noting, however, that said term may also include further embodiments as may hereinafter be described or referenced), may receive contact and other information and data (collectively, "user data") from detected contacts (i.e., other users) and send their own user data thereto based in part on the types of information each user elects to share, the nature of the relationship between the users, and the conditions under which any user data may be shared. Generally, each user may receive user data from and transmit user data to other users, for example, by way of a server in communication with each user device, thereby resulting in a real-time exchange of user data, subject to any limitations as may be imposed by each user.

As used herein, the term "user" includes individuals and entities using the application, for example, at least based on the existence of an account profile belonging thereto. As used in the singular form, "user" may refer to a human user by example. As used in the plural form, "users" may refer to one or more potential contacts and/or registered contacts. Notwithstanding the foregoing, it will be apparent that "user" may include various other embodiments as may hereinafter be described or referenced.

Figure 1:
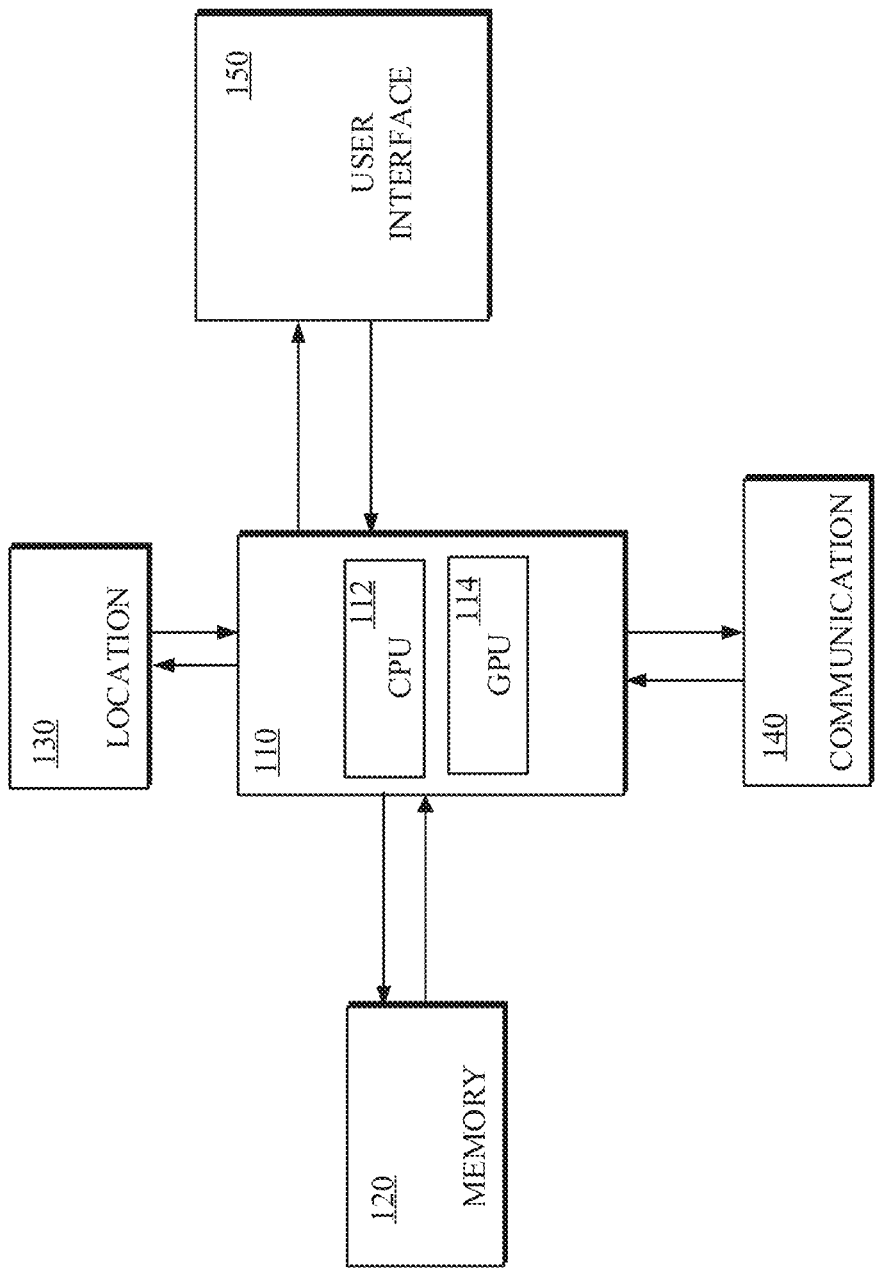
FIG. 1 is a diagram of an example of an apparatus for data sharing in accordance with implementations of this disclosure.

FIG. 1 is a diagram of an example of an apparatus for detecting contact proximity and sharing contact information in accordance with implementations of the present disclosure.

A user device 100 for detecting contact proximity and sharing contact information may include a processing unit 110, a memory unit 120, a location component 130, a communication component 140, a user interface unit 150, or a combination thereof. The user device 100 may be an electronic device, which may be, without limitation, a smartphone, personal digital assistant, tablet computer, laptop computer, desktop computer or other Internet-connectable device.

The processor 110 may be one or more various computer processors used to process data and perform computing tasks including without limitation a central processing unit (CPU) 112, and/or a graphical processing unit (GPU) 114 as shown in FIG. 1. In some embodiments, the CPU 112 or GPU 114 may be implemented as a microcontroller, microprocessor, or an application specific integrated circuit (ASIC), or a combination thereof.

The storage memory 120 may be one or more various volatile and nonvolatile memory types including without limitation random access memory, read only memory, flash memory or other removable/non-removable storage media. The storage memory 120 may include a system memory module that may store executable computer instructions that, when executed by the processor 110, perform various user device functionalities including those described herein. The storage memory 120 may store data, including user account information or contact information, entered by the user via user interface unit 150 or received from the communication component 140.

The location component 130 may include, for example, a global positioning system module or geolocation module, which, based on its configuration, may be in communication with satellite or other external systems for tracking the location of an electronic device. In some embodiments, the positioning data received by the location component 130 may be one or more of a set of coordinates and a common address (e.g., a street address along with corresponding city, state/province/country information). The location component 130 may identify a location of the user device 100 using positioning data. The communication component 140 may send and receive electronic data including, for example, user data. The user interface unit 150 may maintain the user's account profile and user data and the user data of other users, as well as receiving user commands to be processed.

The communication component 140 may include, for example, a modem or other hardware module or adapter for connecting the electronic device to a network, such as an intranet, local network, or the Internet, either through a physical connection (e.g., Ethernet) or wireless connection (e.g., Wi-Fi). In some embodiments, the communication component may connect the user device to, and thereafter communicate with, a server and/or one or more other user devices.

The user interface unit 150 may include one or more units that may register or receive input from a user or present outputs to the user, such as a display, touch interface, a proximity sensitive interface, a light receiving/emitting unit, sound receiving/emitting unit, a wired/wireless unit, or other units. In some embodiments, the user interface unit 150 may include a display, one or more tactile elements (e.g., buttons or virtual touch screen buttons), lights (e.g., LED), speakers, or other user interface elements. The user interface unit 150 may receive user input and provide information to a user related to operation of the user device 100. The interface unit 150 may include, for example, part of a software application installed on and executed by the processor 110 and configured to receive and store user data, contact data and other information stored in the memory 120.

In some embodiments, the user interface unit 150 may include a display screen, such as a touch screen, for displaying content and receiving user commands to be processed. The user interface unit 150 may be supported by one or more input configurations including without limitation a keyboard and/or mouse configuration, a touchscreen configuration, and a microphone and speaker configuration. In some embodiments, the user interface unit 150 $g$ may include user-selected customization features for creating and maintaining user data in an account profile. For example, the user interface unit 150 may include graphical features to enable the user to establish settings data, which may include various settings for modifying or limiting certain aspects of the software application.

The user data, the contact data, the settings data, or a combination thereof, may be stored within the storage memory 120 of the user device 100, within non-transient memory contained within the server, or a combination of both. For example, data associated with the user account profile may be input using the user interface unit 150, which may be immediately stored in storage memory 120 of the user device 100, and may be transmitted via the communication component 140 to a network server for storage in the network database within the server memory. The user data, contact data, and settings data may be communicated to the server periodically or in response to data changes, for example, to update contact data registered with various users or record select user preferences.

The account profile of the user may include user data of the user, which is viewable at least in part by certain other users. For example, "registered contacts" referred herein as network users with whom user data is being shared with the user, may view user data of the user. In some embodiments, the account profile may comprise various graphical features. For example, a picture (which may include without limitation a photograph, a computer generated image, a solid color, or a patterned image) may be uploaded to use as the background for the user account profile, or a picture may be retrieved from a library provided by the application or server. In some embodiments, the various media files, such as video, audio and picture files, may be uploaded to the account profile and made available for viewing by other users. For example, an entity user may upload commercials or other marketing materials to the account profile to promote goods and services to potential customers.

The user data may include information relative to an account profile of a user and may comprise name, title, company, availability status, account picture, phone and mobile numbers, mailing addresses, email addresses, facsimile numbers, social media links, websites, birthday, anniversary, and/or other information associated with the user. The user data may be received from a user interface. In some embodiments, user data may further include present and past location data for the user. The user data may be organized into one or more profiles (e.g., a work profile comprising the user's business contact information and a home profile comprising personal contact information), to permit the user to conveniently elect for only certain profiles to be publicly viewable, and/or to distinguish professional and personal user data for presentation to other users.

The contact data may include user data relative to registered contacts, which may be viewable by the user, for example, as a contact list accessible within the application. In some embodiments, the registration of further contact data or modification of existing contact data for a registered contact may be automatic according to user-based configuration by the user. In some embodiments, the registration of further contact data or modification of existing contact data for a registered contact may be received from a user interface in response to user entry. As an example of automatic modification, a registered contact of the user may elect to no longer share certain contact data with the user, permissions for the contact data relative to the user may be changed by the registered contact, thereby causing that contact data to no longer be viewable by the user. The contact data may be organized into one or more profiles as set by the corresponding user.

The settings data may include settings configured by the user device in accordance with selections by the user. In some embodiments, the settings data may be input to the user device via a user interface, such as the user interface unit 150 of FIG. 1. For example, an application may be executed to graphically display various configurable settings on a touch screen, and in response to user input, record and save the settings data to a memory of the user device, such as the memory 120. The settings data may be sent to a network server and stored in a memory unit of the network server as parameters when executing data sharing and detection of potential contacts in accordance with this disclosure. In some embodiments, the settings data may include a proximity range setting, a detection preferences setting, a user data setting, or a combination thereof.

The proximity range setting may indicate a particular proximity range relative to the user device location, within which searching and detecting of other users may be executed, such as searching and detecting potential contacts for the user within a two mile radius of the user's present location. In some embodiments, a network server may receive the proximity range setting from the user device, and may identify other users concurrently located within proximity of the user corresponding to the proximity range setting. In some embodiments, the user device may include a location detection function that uses peer-to-peer signals with a user device of another user located within a proximity of the user as defined by the proximity range setting. The proximity range setting may be fixed and unchangeable, or may be adjustable by the user.

The detection preferences setting may be defined by the user and may identify other users individually or a classification of users as potential contacts to be detected within the proximity range. For example, the detection preferences setting may be set to allow all users to be detected, or it may instead allow only certain selected users (e.g., entities that are restaurants, users identified by a first name, age, or gender, or other criteria) to be detected.

The user data setting may indicate the degree to which the user data (or specific portions thereof) is viewable by other users. In some embodiments, the user may define all or select portions of the user data as being public user data (i.e., automatically viewable by other users) or private user data (i.e., only viewable by other users upon the user granting permission therefor). The user may modify the user data setting from an initial setting. For example, the user data setting for a portion of the user data may be changed from public user data to private user data, and vice versa.

Based on the settings data, the server may detect other users located within the defined proximity range. Users who have not previously shared user data with the user, as well as users who have, but who no longer are sharing user data with the user, may be defined as "potential contacts." Users who are currently sharing user data with the user may be defined as "registered contacts." In some embodiments, upon detecting a potential contact, the user may send an exchange request to the potential contact by electing to share all user data, some user data, or no user data with the potential contact, provided that user data defined as public may automatically be shared upon initiating the exchange request. Upon the potential contact and the user each agreeing to share user data with one another, the user and the potential contact each become registered contacts to one another, and user data of the potential contact may be shared with the user as contact data and vice versa. In some embodiments, the user and a potential contact or registered contact may elect to enter into a private chat wherein they may communicate messages to each other.

Figure 2:
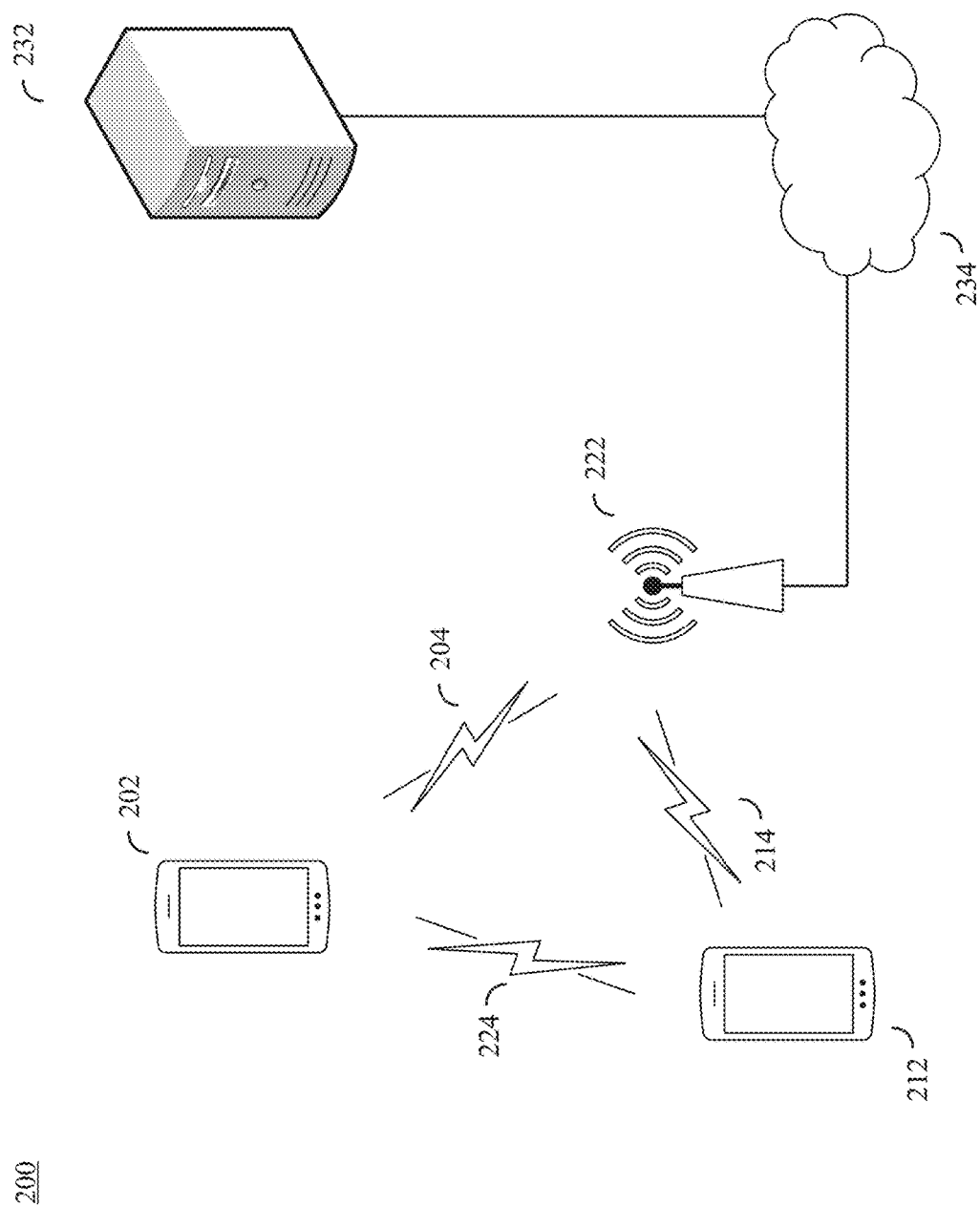
FIG. 2 is a diagram of an example of a system for data sharing between devices based on relative proximity in accordance with implementations of this disclosure.

FIG. 2 is a diagram of an example of a system for data sharing between devices based on relative proximity in accordance with implementations of the present disclosure.

In some embodiments, a system 200 may include a user device 202, which may be configured as shown and described herein with reference to user device 100 in FIG. 1. The system 200 may also include one or more other user devices 212, a network access point 222, and a network server 232. The system 200 may also include communication links 204/214/224 and network 234.

The user device 202 may communicate with the network entities via communication link 204, and may access the network server 232 via a network or internet connection 234. The one or more other user devices 212 may be located within the proximity range as defined by the proximity range setting. In some embodiments, the user device 202 may communicate with the network server 232 to set up the account profile of the user and to upload the settings data onto the network server 232. The network server may detect the one or more user devices 212 as being associated with potential contacts for the user of user device 202 in response to an action by the user. For example, the user may open or start an application on the user device 202, which may automatically send a signal on communication link 204 to the access point 222 and forwarded to the network server 232 over the internet or network 234. The signal may include the location data and/or the settings data of the user device 202. Meanwhile, one or more other users registered with the network on associated user devices 212 may have communicated respective location data to the network server on communication link 214 via the access point 222 and the network 234. Based on the location data and/or settings data received from the user devices 202/212, the network server 232 may identify one or more user devices 212 as being located within the proximity range as set by the user device 202, and as such, are identified as potential contacts for the user of user device 202. In some embodiments, the user devices 202/212 may exchange location data directly, such as through a peer-to-peer communication link 224, which may then be transmitted to the network server 232.

In some embodiments, the user device 202 may receive an indication from the network server 232 of user devices 212 associated with potential contacts, as identified by the network server 232. The user device 202 may display the potential contacts on a user interface, from which a potential contact may be selected for exchanging user data such as contact information. The user device 202 may send the potential contact selection to the network server via the communication link 204. In response to the potential contact selection, the network server 232 may send a request to the user device 212 of the potential contact for exchanging contact information with the user of user device 202. If the potential contact agrees to exchange data with the user of user device 202, the data sharing may be transmitted via the network over communication links 204/214, or the data sharing may be transmitted directly via link 224. In some embodiments, the user and the new contact may commence a chat session via the network over communication links 204/214, or the chat session may be transmitted directly via peer-to-peer link 224. For example, a user sharing application may be activated on both the user device 202 and the device 212 of the new contact, which enables a chat session to be initiated by either the user or the new contact.

Figure 3:
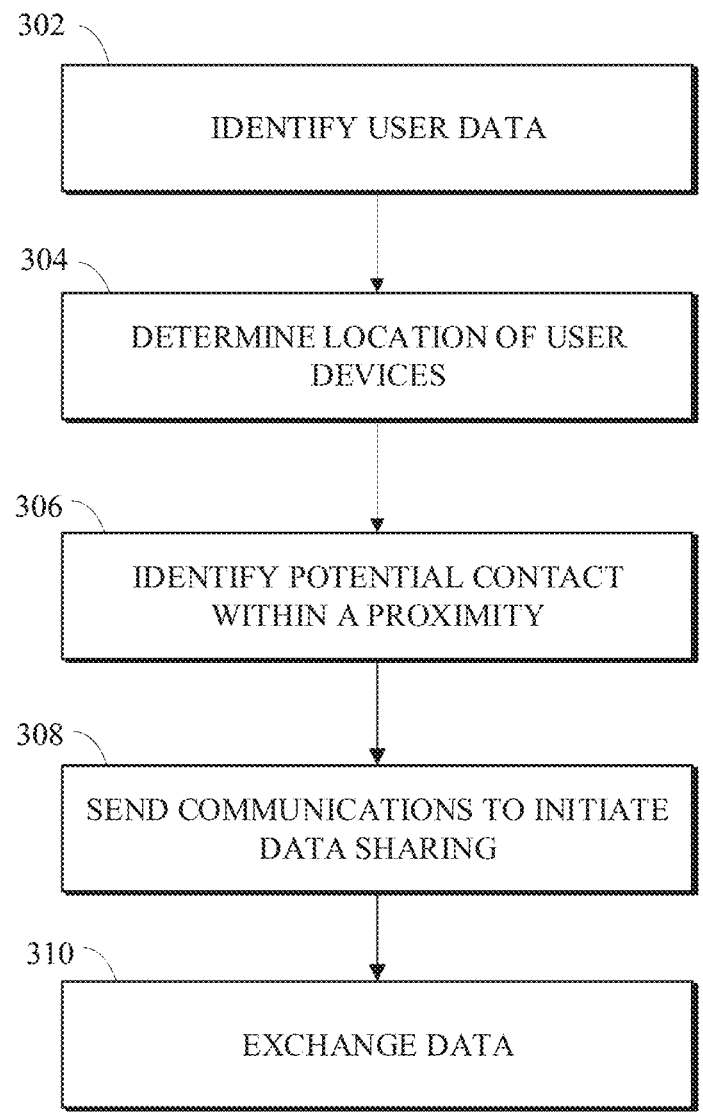
FIG. 3 is a flowchart diagram of an example of a method for data sharing between devices of FIG. 2 based on relative proximity in accordance with the implementations of this disclosure.

FIG. 3 is a flowchart diagram of an example of a method for data sharing between devices of FIG. 2 based on relative proximity in accordance with the implementations of the present disclosure. The method 300 may include identifying user data of a user at 302, determining a location of the user at 304, identifying a user device of a potential contact located within a defined proximity of the location of the user at 306, sending communications to initiate data sharing at 308, exchanging the data between the user the potential contact at 310, or a combination thereof.

In some embodiments, the method 300 may be implemented as a computer readable medium that stores instructions executable by processor. In some embodiments, the instructions may be stored in a memory, such as a memory in the network server 232 of FIG. 2, and may be executed by one or more processors in the network server 232. In some embodiments, the method 300 may be executed by the network server 232 to enable data sharing between user devices, such as the user device 202 and the one or more other user devices 212.

In some embodiments, the user data for registered users may be identified by the network at 302. For example, the user profile of each user includes the contact information of the user, which is recorded during registration and stored by the network server 232. Any updates to the contact information may be based on user input at the user device, and may be recorded and stored by the network server 232.

In some embodiments, the location of the user device 202 may be determined at 304. As detection of potential contacts is dependent upon location data of the user, the network server 232 regularly identifies the location of the user device 202 based on location data determined by the location component and transmitted by the communication component of the user device, such as location component 130 and communication component 140 of FIG. 1. In some embodiments, the communication of location data to the server may be dependent upon the location component 130 being enabled (e.g., wherein the electronic device is a smartphone, the GPS feature must be enabled in order for the user's location data to be communicated).

In some embodiments, a potential contact located within the selected proximity range may be identified at 306. The network server 232 may maintain records of location data for all user devices in communication with the network server 232. The location of other user devices 212 may be computed, for example, by calculating the distance between the user device 202 and other user devices 212. In the event other user devices 212 are determined to be within the proximity range defined by the settings data, subject to any detection preferences defined by the user, such other user devices 212 may be detected by the network server 232 based on the location data. In some embodiments, the network server 232 may notify the user that potential contacts are nearby. For example, the user device 202 may receive the notification of potential contacts, and execute a visual display for identifying the locations of potential contacts, such as by visually denoting the locations on a map. The user may then select one or more detected users to share user data with, subject to each user's user data settings.

In some embodiments, the network server may generate and send messages between the user and the potential contact related to data sharing at 308. For example, in response to the user's selection of a potential contact, a request message may be sent from the user device 202 indicating a request for an invitation message to be sent to the potential contact. The request message may include a permission setting indicating which user data and/or which user data profile of the user is selected to be shared with the potential contact. Responsive to receiving the request message, the network server 232 may generate and deliver the invitation message to the device 212 of the potential contact. A response message may be sent from the device 212 of the potential contact indicating acceptance or denial of the invitation. Responsive to receiving the response message, the network server 232 may generate and deliver a response message to the user device 202.

In some embodiments, the user device 202 may send the exchange request (e.g., via an electronic message) to the potential contact, via the network server 232, which the potential contact may accept, for example, by similarly selecting to share user data or entering into a chat conversation with the user. The potential contact may decline the exchange request, for example, by refusing to share any user data or refusing to enter into the chat conversation.

In some embodiments, the user device 202 may exchange data with the device 212 of the selected potential contact at 310. The user and potential contact may each select which user data is to be shared. For example, the data exchange may be limited based on permission settings elected by the user and/or the potential contact. In response to the network server 232 receiving a message from the device 212 of the potential contact identifying the potential contact's user data selected to be shared with the user, such as according to a permission setting, the network server 232 may send the acceptance response message to the user device 202. The network server 232 may designate the user and the potential contact as registered contacts to each other, and the user data selected to be shared by the user and the potential contact may be registered as contact data respectively. The network server 232 may execute the data sharing by sending user data of the user, such as contact information, to the device 212 of the registered contact, and by sending user data of the potential contact, such as contact information, to the user device 202.

Figure 4:
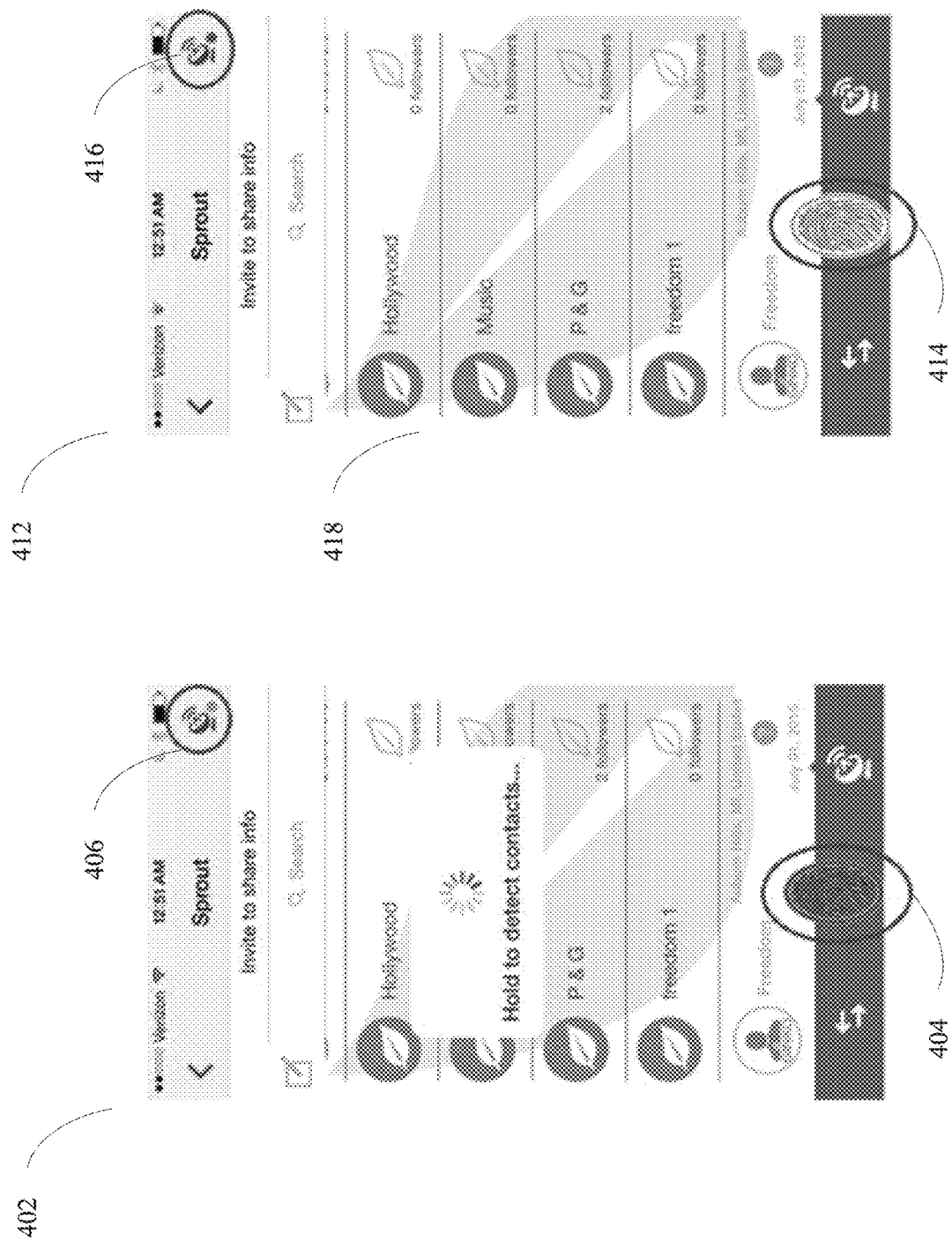
FIG. 4 is a diagram of an example of a user interface for in accordance with implementations of this disclosure.

FIG. 4 is a diagram of an example of a user interface display for detecting contacts responsive to user input in accordance with implementations of this disclosure. In some embodiments, the user device 202 may display an application interface display 402 for initiating a detection of contacts, and after an elapsed time duration of the detection, an application interface display 412 for indicating the results of the detection of contacts may be displayed. For example, the application interface display 402 may include a detection start icon 404 to enable the user to commence a request for detection of potential contacts in the vicinity of the user device, and a detection icon 406 that may provide an indication of status for the detection being processed by the network server. For example, the user device may respond to the user touch and/or holding the touch of the detection start icon 404 by sending location information of the user device to the network server. In some embodiments, the location component 130 of FIG. 1 may remain active for as long as the activation feature is manually toggled by the user touch of detection start icon 404. In some embodiments, the detection start icon 404 may respond only to a unique identifier, such as the user's fingerprint. The application interface display 402 may provide visual feedback that may include, for example, a color change or blinking of detection icon 406 to indicate status of the detection, which may include that the detection is in progress. The application interface display 412 may include a detection icon 416 for detection status indication, such as indicating that the detection processing is completed by changing the appearance of the detection icon 416 from detection icon 406 and/or a change in appearance of detection start icon 414 compared to detection start icon 404. Contact display region 418 may indicate the results of the detection process by identifying user identification or tags of potential contacts found to be within the proximity range defined in the proximity range setting.

Figure 5:
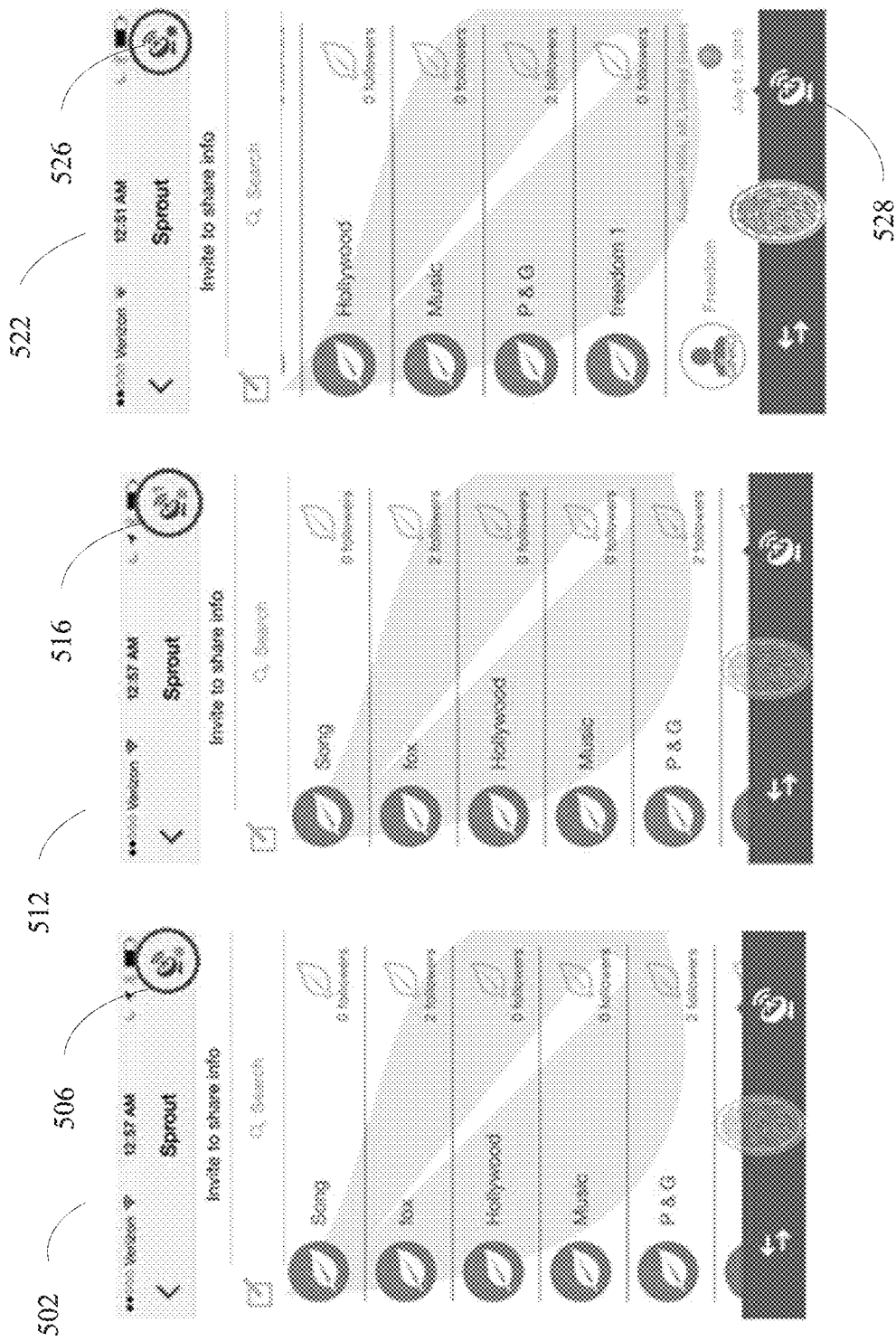
FIG. 5 is a diagram of an example of a user interface display for detecting contacts automatically in accordance with implementations of this disclosure.

FIG. 5 is a diagram of an example of a user interface display for detecting contacts automatically in accordance with implementations of this disclosure. In some embodiments, the user device 202 may display an application interface display 502 for an automatic detection mode, an application interface display 512 for indicating a status change for detection of potential contacts, and an application interface display 522 that indicates that automatic detection mode has been toggled off. For example, the application interface display 502 may include a detection icon 506 that may indicate an automatic detection mode for detecting potential contacts in the vicinity of the user device, such as by a visual indication that may include an icon color. The application interface display 512 may include a detection icon 516 that may indicate a new potential contact has been automatically detected, such as by a visual indication that may include a numeral corresponding to a number of new potential contacts detected. The application interface display 522 may include a detection mode icon 528 that enables a user to toggle between automatic detection mode and user initiated detection mode, and a detection icon 526 that may indicate the status change for the automatic detection mode, such as by a change in icon color.

In some embodiments, the user activated contact detection of FIG. 4 may enable a single one-time detection search by the network server, which may conserve resources of the user device and the network. In some embodiments, automatic contact detection of FIG. 5 may enable contact detection continuously while the automatic mode is activated. For example, automatic contact detection mode may be activated by toggling one or more activation features, that may include activating the location component 130 of FIG. 1 for an unspecified period of time (e.g., until the user subsequently deactivates the location component 130), and activating the location component 130 for a specified period of time (e.g., one hour). For example, tapping the detection icon 506 once may trigger contact detection activation for an unspecified period of time, tapping the detection icon 506 twice may trigger contact detection activation for a specified period of time, and tapping the detection icon 506 three times may deactivate the location component 130 and the contact detection process. The activation features for contact detection described herein are provided as examples, and other ways of user activation and automatic activation are possible for implementations of this disclosure.

Figure 6:
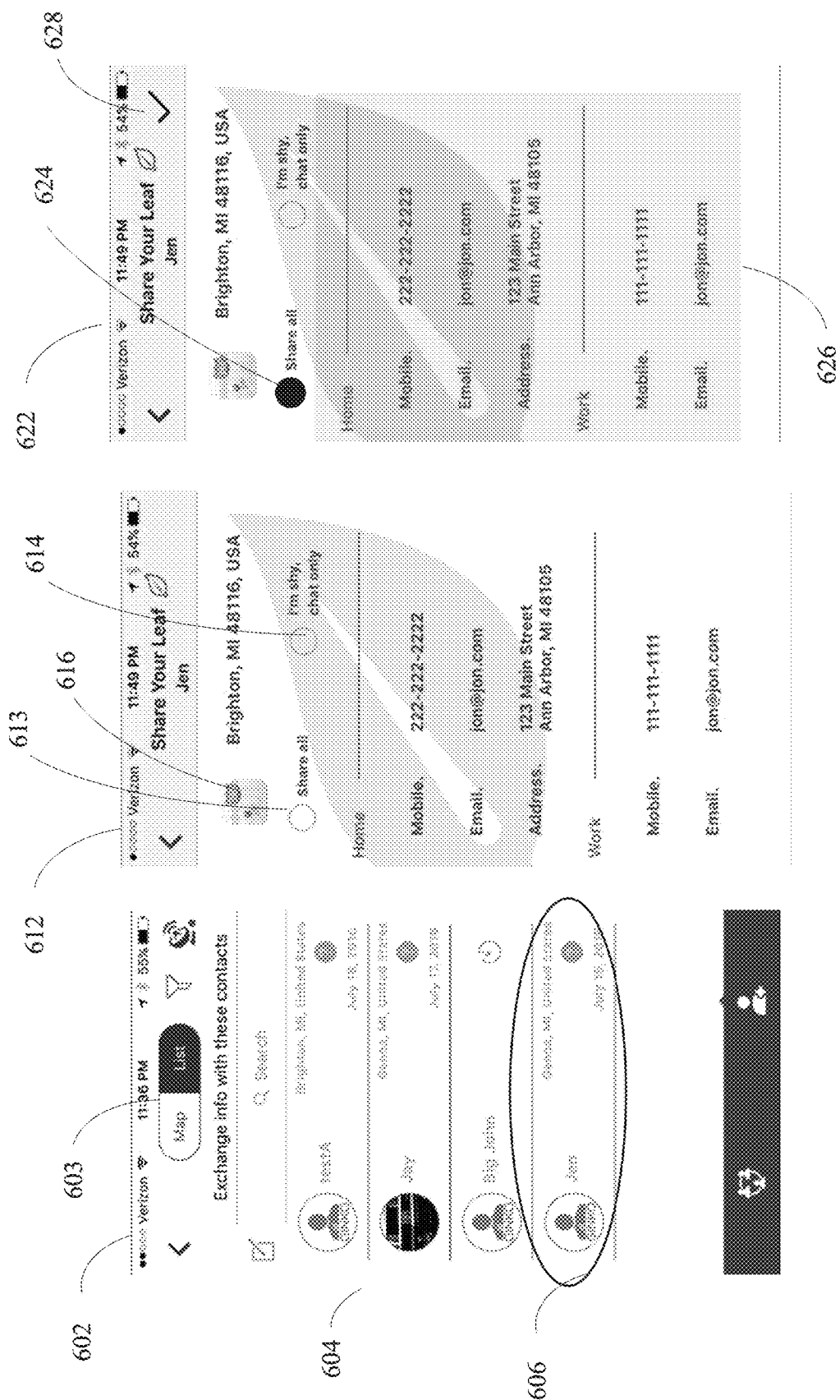
FIG. 6 is a diagram of an example of a user interface display for selecting user data for data sharing in accordance with implementations of this disclosure.

FIG. 6 is a diagram of an example of user interface display for selecting user data for data sharing in accordance with implementations of this disclosure. In some embodiments, application interface displays 602/612/622 may display information related to data sharing between the user and a potential contact identified by the contact detection of FIGS. 4 and 5. For example, the application interface display 602 may show registered contact identifications 604 and potential contact identifications 606 that may be distinguishable by having a different visual appearance or graphical representation. In some embodiments, the registered contact identifications 604 and potential contact identifications 606 may be displayed in a list format, as shown, in response to a user input at format icon 603 selecting a list format, such as by a touch screen tapping. The registered contact identifications 604 and potential contact identifications 606 may be arranged in the application interface display 602 in various ways, including alphabetically, by proximity to the user, time of detection, or based on frequency of previous exchanges. A data exchange with a potential contact may be initiated by the user device 202 in response to receiving user input, such as by tapping the potential contact identification

606 associated with the potential contact. The user device 202 may send a request signal to the network server 232 identifying the selected potential contact and indicating the user's request for sending an invitation for data exchange from the user device 202 to the device 212 of the potential contact.

In some embodiments, the application interface display 612 may be displayed in response to the request to exchange data, and may include selectable user data of the user, from which the user may select which user data of one or more user profiles to share with the potential contact. For example, the application interface display 612 may provide options for the user to share all data via icon 613, selectively share only certain user data (e.g., only certain profiles or portions thereof), or share no user data and instead request to enter into a chat conversation with the potential contact, by selection of chat only icon 614 for example.

In some embodiments, location region 616 of the application interface display 612 may indicate a location for the user device when the user device associated with potential contact identification 606 was detected by the network and identified to the user device 202.

In some embodiments, the application interface display 622 may indicate the user selection for user data for the data exchange. For example, a share all icon 624 may be responsive to user input, such as by touch screen tapping the icon 624, and all user data of the display may be visually altered for feedback display, such as shown by a highlighted region 626, to indicate confirmation by the user device 202 for the user selection. In some embodiments, the application interface display 622 may provide an interface for the user to accept the selected data sharing information, such as by touch screen tapping the accept icon 628. In response to the user input at the accept icon 628, the user device 202 may execute a data sharing request to the network server 232.

In some embodiments, the user device 202 may provide global user data changes by the user. For example, an application interface display may be presented to the user on the user interface unit 150 which shows the user data for all user profiles of the user as recorded on the network server 232. The user data profiles may be edited at any time by the user, allowing all registered contacts to have access to current user data once the user data is edited by the user and saved to the network server 232. Unlike with one-off transmissions of contact information, or exchanging of business cards, the user need not redistribute updated contact information since the update may be global via the central repository in the network server 232.

Figure 7:
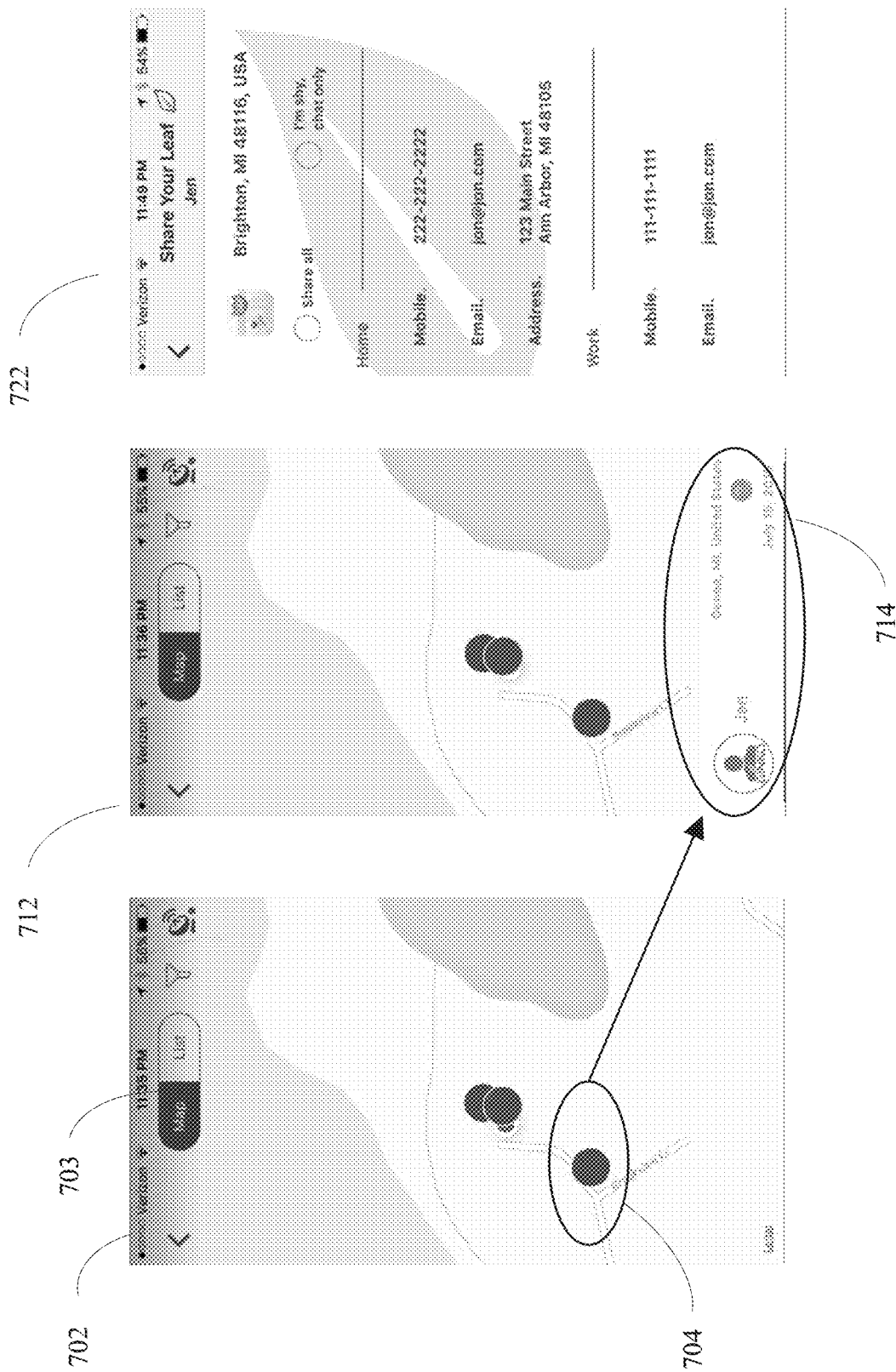
FIG. 7 is a diagram of an example of a user interface display for identifying a potential contact based on location in accordance with implementations of this disclosure.

FIG. 7 is a diagram of an example of a user interface display for identifying a potential contact based on location in accordance with implementations of this disclosure. In some embodiments, an application interface display 702 may display location information related to potential contacts, such as on a map, in response to user input at format icon 703, which may provide a selectable display for potential contacts in a map format or list format. For example, in response to user input selecting map format at format icon 703, such as by a touch screen tapping, the application interface display 702 may show markers 704 representing potential contacts in respective map locations. In some embodiments, a user input selection of a marker 704 may trigger a generation of an application interface display 712 which may show an identifier region 714 for the potential contact associated with the selected marker 704. In response to a user input, such as by touch screen tapping at the identifier region 714, an application interface display 722 may be generated for presenting selectable user data for sharing with the selected potential contact. The user may interface with the application interface display 722 as shown and described herein with respect to FIG. 6.

Figure 8:
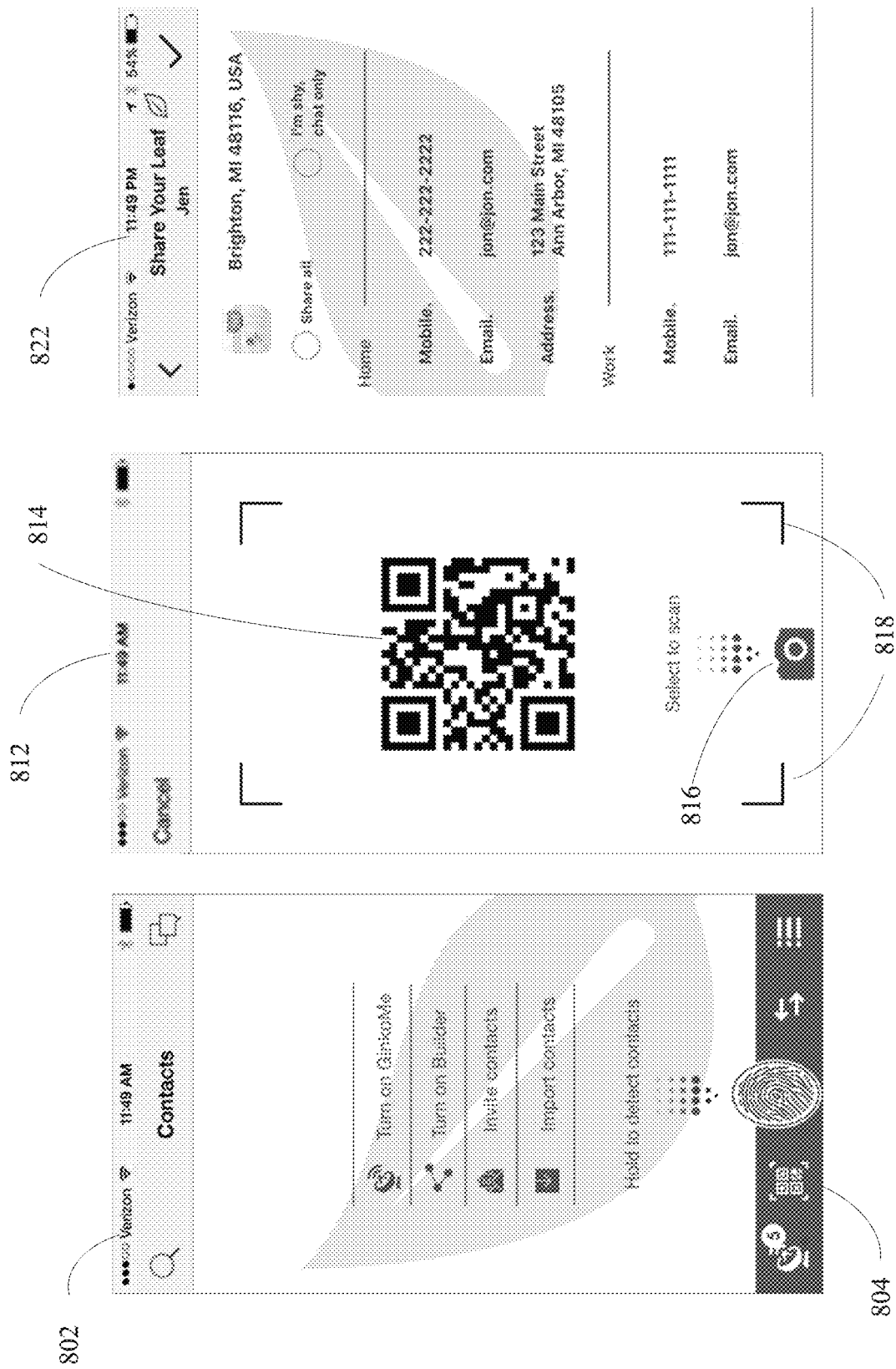
FIG. 8 is a diagram of an example of a user interface display for identifying a potential contact by scan code in accordance with implementations of this disclosure.

FIG. 8 is a diagram of an example of a user interface display for identifying a potential contact by scan code in accordance with implementations of this disclosure. In some embodiments, an application interface display 802 may display a contacts screen, including a scan icon 804 for permitting interfacing with another user device. For example, in response to a user input at icon 804, such as by a touch screen tapping, an application interface display 812 may be generated and a camera in user device 202 may be activated for capturing a scan code display of a user device associated with a potential contact. In some embodiments, in response to the camera of the user device 202 being aimed at a scan code, the application interface display may show the scan code 814 as captured by the camera, and may provide markers 818 as a view finder to assist the user in centering the scan code for the camera to focus. The camera icon 816 may be responsive to a user input, such as by a touch screen tapping or sliding, and may execute the scan of the scan code. An application interface display 822 may be generated in response to the scan execution, which displays the selectable user data screen from which the user may input whether to share all user data, share some user data, or chat only, in a manner as shown and described herein with respect to FIG. 6.

Figure 9:
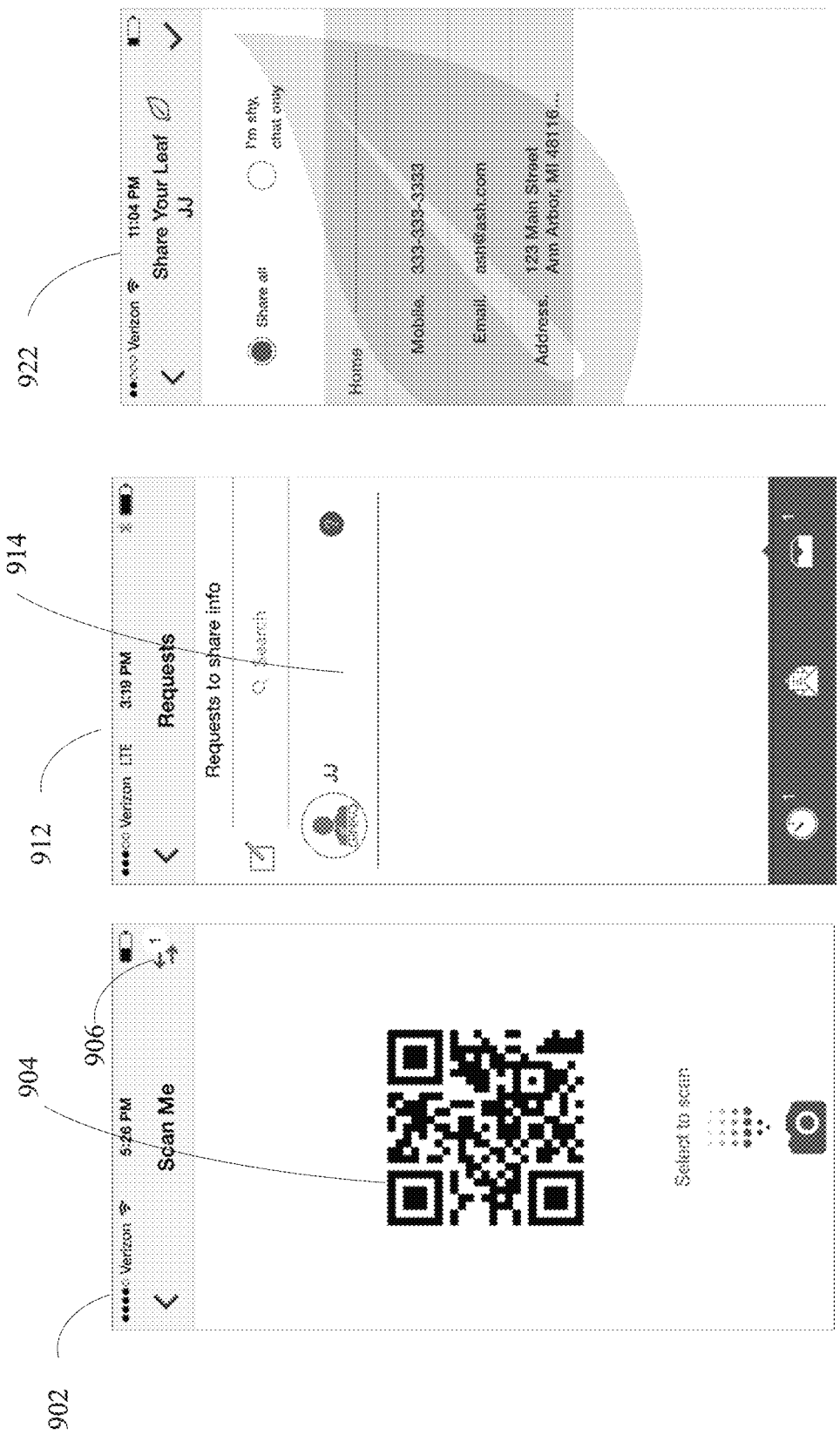
FIG. 9 is a diagram of an example of a user interface display for sharing user data by scan code in accordance with implementations of this disclosure.

FIG. 9 is a diagram of an example of a user interface display for sharing user data by scan code in accordance with implementations of this disclosure. In some embodiments, an application interface display 902 may display a scan code 904 so that another user device may read the scan code for identification as a potential contact. For example, the user device associated with scan code 904 of the display 902 may be presented to another user device that operates the scan code reader, such as the user device 202 that displays captured scan code 814 in FIG. 8, where the captured scan code 814 corresponds to displayed scan code 904. In some embodiments, in response to receiving a request for user data sharing from another user device, such as the user device of FIG. 8, the application interface 902 may display an indication of the received request at pending exchange icon 906, which may be responsive to user input. For example, in response to a user input at pending exchange icon 906, such as by a touch screen tapping, an application interface display 912 may be generated to display the potential contact identifier 914, which may be responsive to user input for accepting the request. In some embodiments, an application interface display 922 may be generated in response to the user input at identifier 914, to provide selectable user data for exchange to the requester. For example, the user may input at the application interface display 922 whether to share all user data, share some user data, or chat only, in a manner as shown and described herein with respect to FIG. 6.

Figure 10:
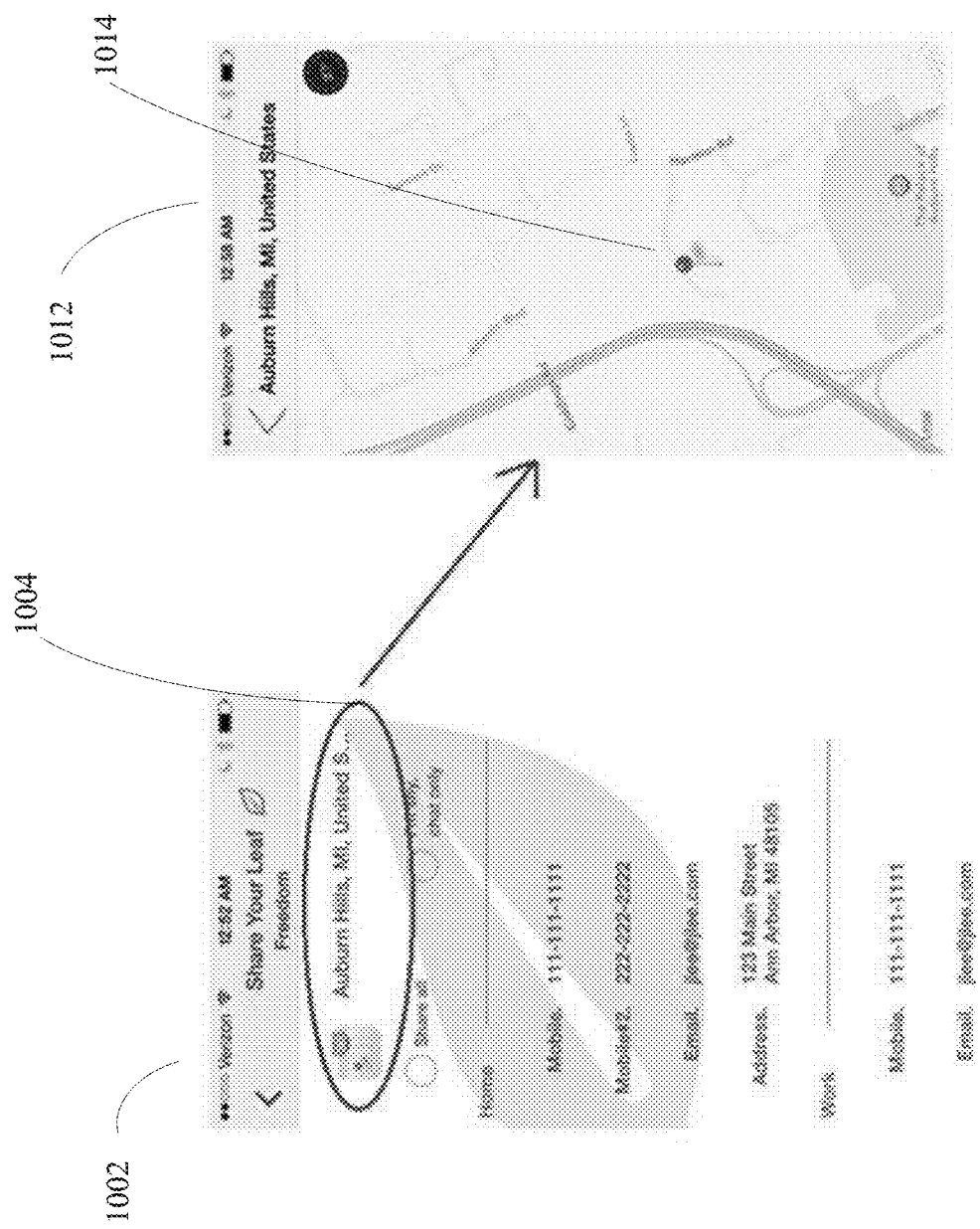
FIG. 10 is a diagram of an example of a user interface display for selecting location data for data sharing in accordance with implementations of this disclosure.

FIG. 10 is a diagram of an example of user interface display for selecting location data for data sharing in accordance with implementations of this disclosure. In some embodiments, an application interface display 1002 may display information related to the data sharing with a new contact and selectable by the user for constructing the contact profile information. For example, the application interface display 1002 may indicate the location information 1004 of the user device when the potential contact was detected and may associate the location information 1004 with the new contact registration as additional contact data. The application interface display 1002 may be responsive to user input, such as by tapping the location information 1004, and may generate an application interface display 1012 that shows a representation of the location information 1004 as a map location 1014. In some embodiments, the user interface unit 150 may be responsive to the user input for adding notes or comments within the new contact registration information as further contact data.

Figure 11:
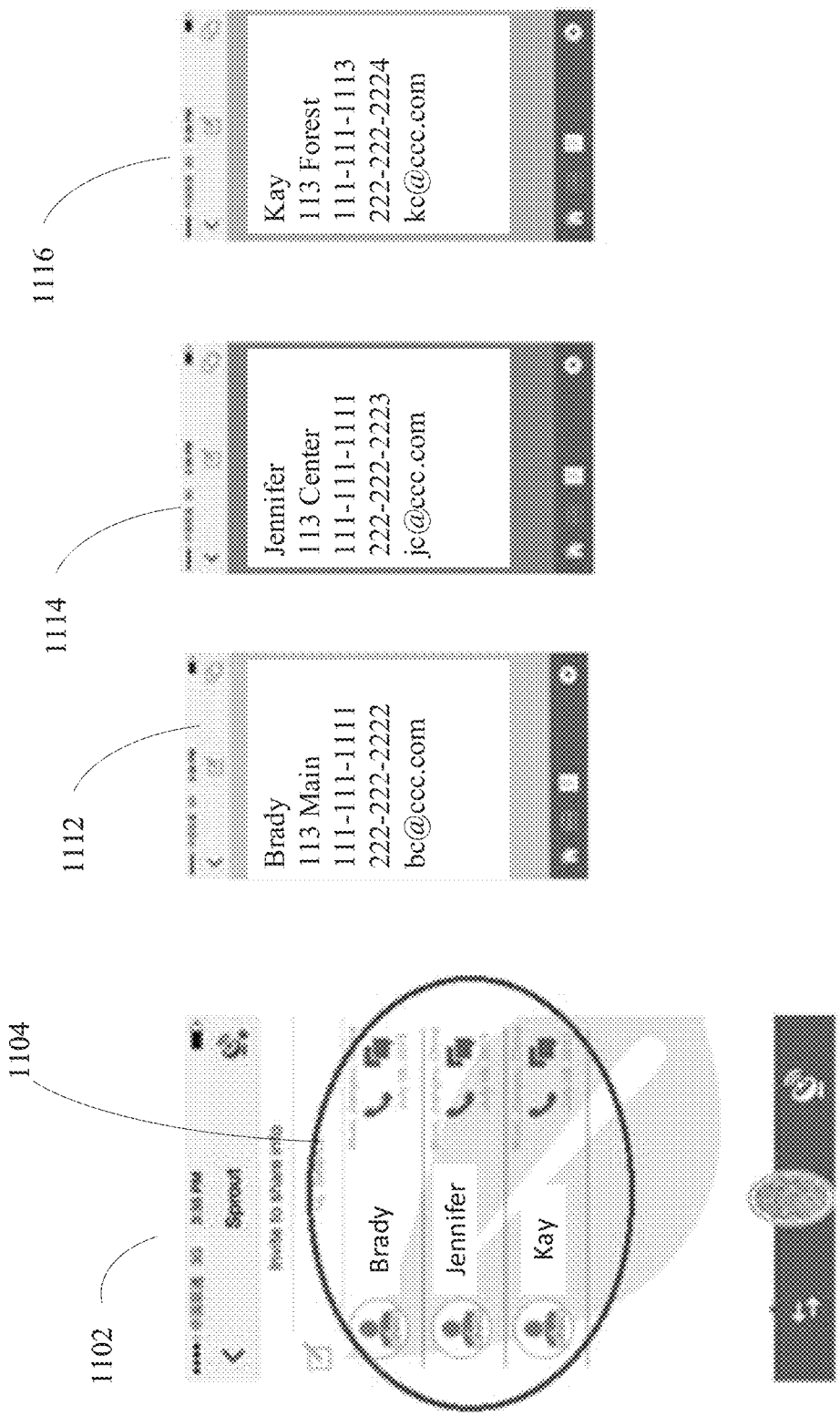
FIG. 11 is a diagram of an example of a user interface display of user data of listed registered contacts in accordance with implementations of this disclosure.

FIG. 11 is a diagram of an example of user interface display for user data of listed registered contacts in accordance with implementations of this disclosure. In some embodiments, an application interface display 1102 may identify registered contacts as a list in a display region 1104 responsive to user input, such as by tapping on a registered contact identification. For example, in response to tapping on registered contact identification in display region 1104, an associated application interface display 1112/1114/1116 may be generated and displayed on user interface unit 150. The application interface display 1112/1114/1116 may show contact data for a given registered contact to be viewed by the user as a contact profile, which may include aspects of the registered contact's account profile, such as the customizable features of profile background pictures and associated media. The viewable contact data for a given registered contact correlates to the permissions set by the registered contact such as any public user data and/or the private user data that the registered contact has agreed to share.

Figure 12:
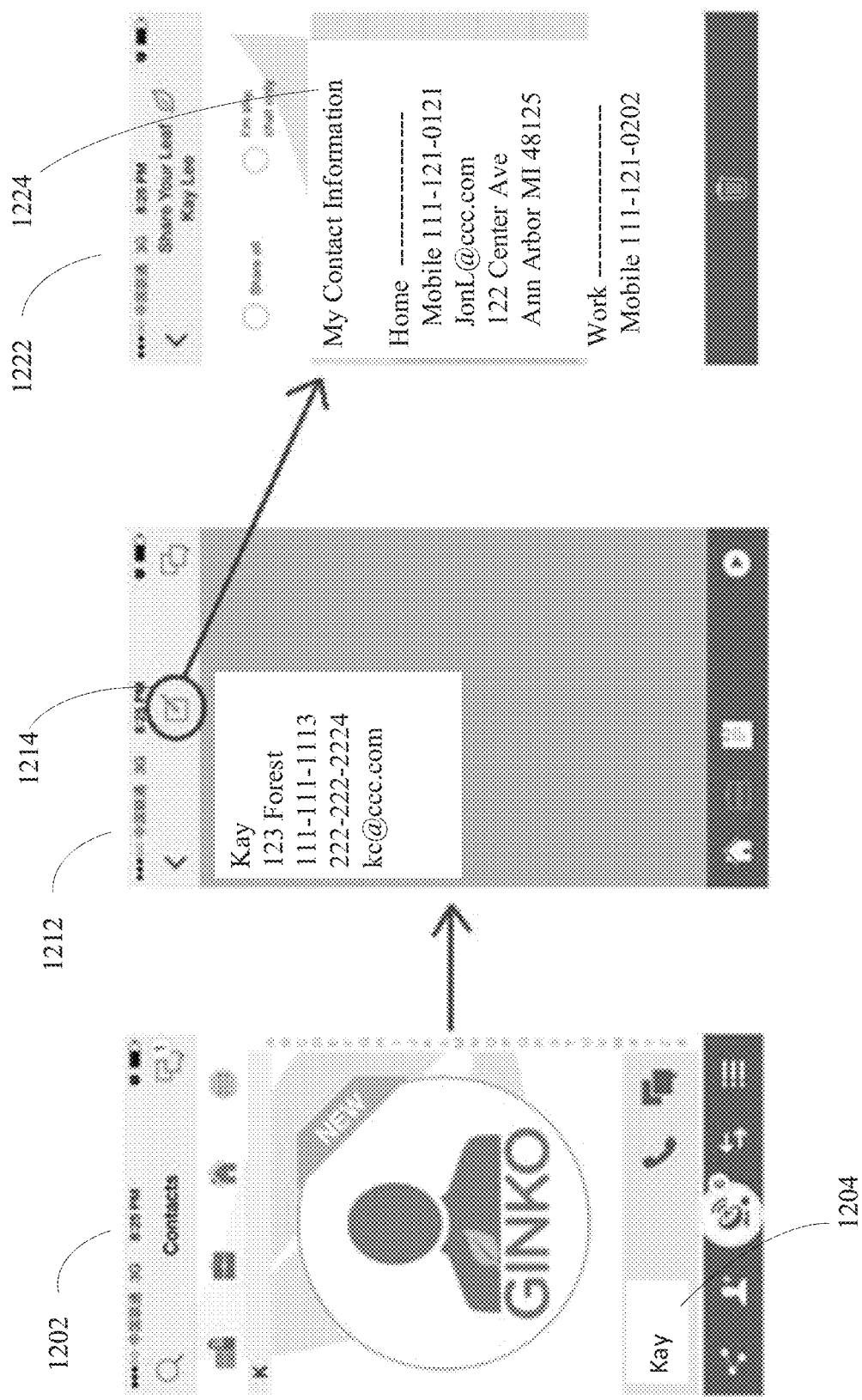
FIG. 12 is a diagram of an example of a user interface display for changing data sharing in accordance with implementations of this disclosure.

FIG. 12 is a diagram of an example of a user interface display for changing data sharing in accordance with implementations of this disclosure. As described herein, and notwithstanding the permissions originally set during an exchange of user data, in some embodiments, the user interface unit 150 may display configurable permission information set for various user data shared with a given registered contact. For example, the permission information may be displayed and may be responsive to user input for electing to share more or share less user data with registered contacts. In some embodiments, an application interface display 1202 may indicate a registered contact in display region 1204, which may be responsive to user input, such as by tapping the display region 1204. In response to the user input, an application interface display 1212 may be generated and displayed to include an editing icon 1214, which may be responsive to a user input. For example, an application interface display 1222 may be generated and displayed to show shared contact information 1224 previously defined for sharing with the registered contact. The shared contact information may be modified in response to user input on display 1222. For example, the user may select certain shared user data and remove it from the contact data registered with the registered contact, without altering the user account profile information, which may remain intact as user data for future data sharing. In some embodiments, the application interface display 1222 may modify shared user data by deleting an entire contact profile and removing all contact data relating to the registered contact in response to user input. In response to the modification to the contact profile by the user device of the user, the network server 232 may modify the user's contact registration to reflect the deletion, and in turn, may delete all contact data of the user within the registered contact's records.

Figure 13:
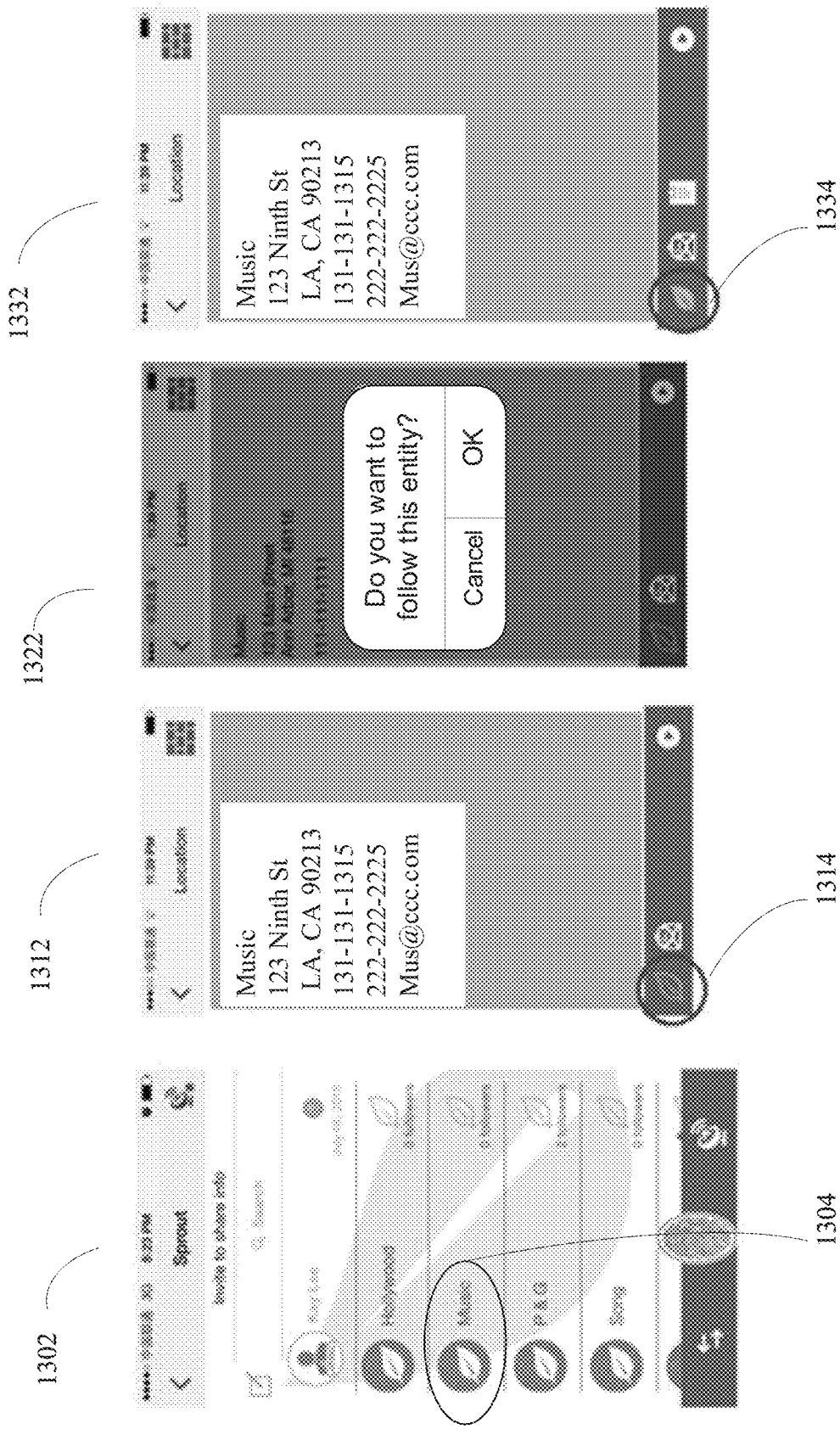
FIG. 13 is a diagram of an example of a user interface display for following registered users in accordance with implementations of this disclosure.

FIG. 13 is a diagram of an example of user interface display for following registered users in accordance with implementations of this disclosure. In some implementations, an application interface display 1302 may respond to user input for following one or more registered users. For example, a registered user identification appearing in display region 1304 may be responsive to user input, such as by tapping the identification on the display, for selection as an entity to be followed by the user. An application interface display 1312 may be generated and displayed in response to the user input, and may include follow icon 1314. In response to user input, such as by tapping the follow icon 1314, an application interface display 1322 may be generated and displayed with a prompt for the user to confirm that the user has selected to follow the entity. On a condition that the user confirms the selection, the application interface display 1332 may be generated and displayed for indicating that the user device will follow the selected entity. As a result of the user device following the selected entity, the network server 232 may send the entity's posts on the network to the user device, and the posts may be displayed on the user interface as a dedicated content feed viewable by the user.

Figure 14:
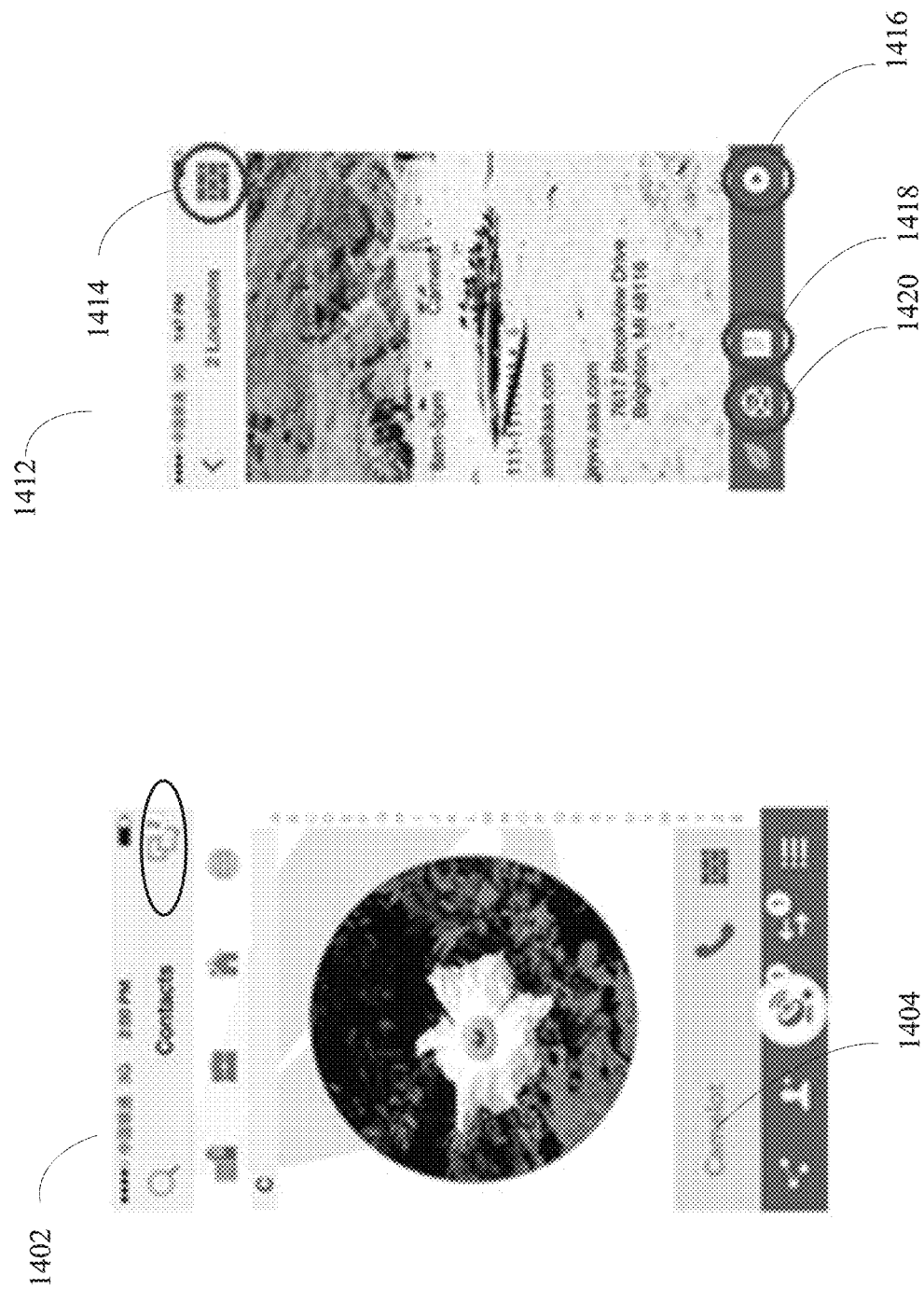
FIG. 14 is a diagram of an example of a user interface display for following registered contacts in accordance with implementations of this disclosure.

FIG. 14 is a diagram of an example of user interface display for following registered contacts in accordance with implementations of this disclosure. In some embodiments, an application interface display 1402 may show a list of followed contacts is display region 1404, which upon selection by the user, such as by tapping the followed contact identification, an application interface display 1412 may be generated and displayed to show the followed contact's content feed information. In some embodiments, the application interface display 1412 may provide options for the user to view information associated with the followed contact, which may include icons 1414/1416/1418/1420 responsive to user input. For example, the user may view the content feed associated with the followed contact by selecting the media icon 1414, or view media associated with the followed contact by selecting the media icon 1416, record notes or comments about the followed contact within the contact profile by selecting the clipboard icon 1418, or recommend the followed contact to other users by selecting the envelope icon 1420. In some embodiments, only contacts whose user data is set to public may be recommended to other users.

In some implementations, an account profile can be set to be a public profile or a private profile. In some implementations, if the account profile of the potential contact is a pubic account, then receiving, from the potential contact, the acceptance of the communication, can be automatic. That is, the potential contact need not explicitly accept the communication. Rather, the acceptance can be automatically generated on behalf of the potential contact. In an example, a network server, such as the network server 232 of FIG. 2, can generate the automatic acceptance on behalf of the potential contact.

In some implementations, the user can cancel a data exchange request. That is, the user can revoke the data exchange request with a potential contact. The request can be cancelled before it is accepted by the potential contact. As such, a cancelled request is removed from the pending exchange requests list, as described with respect to pending exchange icon 906 and the application interface display 912 of FIG. 9. As such, a method according to implementations of this disclosure can include receiving, from the user, a cancellation request of the request. Cancelling the request revokes the request such that the potential contact can no longer accept the request. That is, the request is removed from the pending requests lists of the potential contact.

In some implementations, the user can modify a data exchange request. For example, and referring to FIG. 6, after the user input at the accept icon 628 and executing the data sharing request to the network server 232, the user can modify the data exchange request such as by changing the selection from the share all (i.e., selection of the share all icon 624) to chat only (i.e., by selecting the chat only icon 614).

Reference is now made again to the method 300 of FIG. 3. In the description of the method 300, a potential contact is identified based on a current location of a device of the potential contact. However, that need not be the case according to implementations of this disclosure. The potential contact can indicate that the potential contact is associated with a particular location and the method 300 can identify the potential contact, such as at 306, based on the indication.

For example, a user can leave a contact exchange request for a potential contact at a geolocation. The geolocation can be an address, a landmark name, a cross-roads, a set of coordinates, a GPS location, or any other indication that can be converted to, or have associated, a geolocation. That is, the user can indicate an intention to have a communication sent to the user to initiate data exchange, as described with respect to 308 of FIG. 8, between the user and a potential contact, even though the user is not at the geolocation. The communication can be sent to a potential contact who is proximal to the geolocation. This scenario can be summarized as "if someone comes to a location of my choosing, send that someone a data exchange request."

In an illustrative, but non-limiting, example, a home owner may be aware that a service provider is going door-to-door within the home owner's neighborhood soliciting business. The home owner is interested in the service. However, as the homeowner cannot be home 100% of the time to wait for the service provider, the home owner (i.e., the user) can leave a data exchange request at her home location. If/when the service provider visits the location (i.e., the home) of the homeowner, the service provider receives the data exchange request. In this scenario, the service provider is the potential contact.

An application interface display that is similar to the application interface display 922 of FIG. 9 can be used to initiate a data exchange request. The application interface display can include one or more display elements that allow the user to select a location, to type a location, to select the user's current location, and the like, such that the selected location can be attached to the data exchange request. A network server, such as the network server 232, can send the data exchange request to a potential contact upon determining that the location of the potential contact matches the selected location.

Accordingly, identifying the potential contact at 306 can include receiving, from the potential contact, a first location; and identifying the potential contact in a case that a second location of the user device matches the first location. In an example, the first location is an address (such as a postal address), and the second location is a geolocation that is proximate the first location. In an example, the first location can be converted to a geolocation. In an example, the second location matches the first location in a case that the first location and the second location are within a threshold distance. In an example, the threshold distance can be 10, 20, 30 feet, or some other distance. The threshold distance can be characterized by being a relatively small distance. In another example, the first location is a first geolocation and the second location is a second geolocation that is within a predefined distance of the first geolocation.

Another scenario according to implementations of this disclosure can be summarized as "if someone comes to a location of my choosing, identify me to that someone as a potential contact, even if I am (i.e., even if my device is) not actually at the location." Said another way, a potential contact can place a marker based on an affiliated geolocation or coordinate for detection and exchange by a user.

In an illustrative, but non-limiting, example, a business person has a business address of address 555 N Main Street, Ann Arbor, Mich. The business person is regularly visited by sales representatives. The business person finds value in the interactions with some of the sales representatives and would like to know who visits him when he is out of the office. When the business person is out of office, he can place a marker at that address (or, equivalently, the geolocation of the address) for anyone to detect and exchange information with him. As such, for example, when a sales representative is at the business address, and the sales representative performs, using a user device, an operation (such as via one or more user interfaces that are similar to those described with respect to FIG. 5) to detect contacts automatically, the sales representative can be identified as a potential contact. The business person can be identified as a potential contact in a case that the location of the user device matches the location of the marker. As described above, the location of the user device matches the location of the marker if the location of the user device and the location of the marker are within a predefined distance.

Accordingly, and referring to FIG. 4 again, in an implementation, receiving, from the user device of the user (e.g., the sales representative), the request for the user to become a contact with the potential contact (e.g., the business person) can include receiving a first location that is associated with the request (the first location is received before the request is initiated); and sending, based on the request, the communication to the potential contact to initiate the data exchange can include subsequent to receiving the request from the user, sending the communication to the potential contact on a condition that the first location matching a second location associated with the potential contact.

Accordingly, another method for data sharing between devices in a network can include receiving, from a potential contact (e.g., the business person in the above scenario), a first location (e.g., the geolocation, the postal address, cross roads, etc., of the business address of the business person); and, in a case that a second location of a user device of a user (e.g., the sales representative) matching the first location, identifying, for the user, the potential contact, and receiving, from the user device, a request for the user to become a contact with the potential contact. The request can include a permission setting, which indicates whether a subset of user data of the user can be viewed by the potential contact. The method can also include sending, based on the request, a communication to the potential contact to initiate a data exchange; and, in response to receiving an acceptance of the communication, setting the user as a contact of the potential contact and setting the potential contact as a contact of the user. The subset of the user data is viewable to the potential contact in accordance with the permission.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data sharing between devices in a network, the method comprising:
   identifying, for a user associated with a user device, a potential contact,
      the user being associated with user data, and
      the potential contact being associated with contact data;
   receiving, from the user device of the user, a request for the user to become a contact with the potential contact,
      the request comprises a first permission setting,
      the first permission setting being at least a first value or a second value,
      the first value indicates that a subset of user data of a permitting user is to be shared with a permitted user, and
      the second value indicates that only chats are allowed from the permitted user to the permitting user;
   sending, based on the request, a communication to the potential contact to initiate a data exchange; and
   in response to receiving, from the potential contact, an acceptance of the communication:
      setting the user as a contact of the potential contact,
         the subset of the user data being viewable to the potential contact in a case that the first permission setting is the first value but is not the second value, and the potential contact being able to start a chat with the user in a case that the first permission setting is the second value or the first value; and
      setting the potential contact as a contact of the user.

2. The method of claim 1, further comprising:
   receiving, from the user, a cancellation request of the request; and
   revoking the request such that the potential contact cannot accept the request.

3. The method of claim 1, wherein identifying the potential contact comprises:
   receiving, from the potential contact, a first location; and
   identifying the potential contact in a case that a second location of the user device matches the first location.

4. The method of claim 3,
   wherein the first location is a first geolocation, and
   wherein the second location is a second geolocation that is within a predefined distance of the first geolocation.

5. The method of claim 1, wherein the acceptance of the communication is automatically generated.

6. The method of claim 1,
   wherein receiving, from the user device of the user, the request for the user to become a contact with the potential contact, comprises:
      receiving a first location that is associated with the request; and
   wherein sending, based on the request, the communication to the potential contact to initiate the data exchange comprises:
      subsequent to receiving the request from the user, sending the communication to the potential contact on a condition that the first location matching a second location associated with the potential contact.

7. The method of claim 6, wherein the first location being a first geolocation of the user device.

8. The method of claim 6, wherein the second location being a second geolocation of a device of the potential contact.

9. The method of claim 6, wherein the first location matching the second location comprises the first location being within a predefined distance of the second location.

10. A system for data sharing between devices in a network, comprising:
    a processor; and
    a memory, the memory comprising computer-executable instructions that, when executed by the processor, perform operations comprising:
       identifying, for a user associated with a user device, a potential contact,
          the user being associated with user data, and
          the potential contact being associated with contact data;
       receiving, from the user device of the user, a request for the user to become a contact with the potential contact,
          the request comprising a first permission setting, and
          the first permission setting being at least a first value indicating that a subset of user data of a permitting user is to be shared with a permitted user;
       sending, based on the request, a communication to the potential contact to initiate a data exchange; and
       in response to receiving an acceptance of the communication:
          setting the user as a contact of the potential contact,
             the subset of the user data being viewable to the potential contact in a case that the first permission setting being the first value; and
          setting the potential contact as a contact of the user.

11. The system of claim 10, wherein identifying the potential contact comprises:
    receiving, from the potential contact, a first location; and
    identifying the potential contact in a case that a second location of the user device matches the first location.

12. The system of claim 11,
    wherein the first location is an address, and
    wherein the second location is a geolocation that is proximate the first location.

13. The system of claim 10, wherein the acceptance is automatically generated in a case that a profile of the potential contact is a public profile.

14. The system of claim 10,
    wherein receiving, from the user device of the user, the request for the user to become a contact with the potential contact, comprises:
       receiving a first location that is associated with the request; and
    wherein sending, based on the request, the communication to the potential contact to initiate the data exchange comprises:
       subsequent to receiving the request from the user, sending the communication to the potential contact on a condition that the first location matching a second location associated with the potential contact.

15. The system of claim 14, wherein the first location being a first geolocation of the user device.

16. A method for exchanging user data, comprising:
    receiving user data from a first user;
    creating, in response to first instructions from the first user, a first profile and a second profile,
       wherein the first profile consists of a first subset of the user data and,
       wherein the second profile consists of a second subset of the user data;
    receiving instructions from the user to set the first profile as public and set the second profile as private;
    selecting, in response to second instructions from the first user, a selected profile from one of the first profile or the second profile, to share with a second user; and in response to receiving a request from the second user, sharing the selected profile with the second user, wherein sharing the selected profile with the second user comprises:
   on a condition that the selected profile is public, automatically sharing, without an explicit action by the first user, the selected profile with the second user; and
   on a condition that the selected profile is private, sharing the selected profile with the second user in response to the first user accepting the request.

17. The method of claim 16, wherein receiving the request from the second user comprises:
   displaying, on a device of the first user, a scan code corresponding to the selected profile; and
   receiving the request in response to the scan code being scanned by a second device of the second user.

18. The method of claim 16, further comprising:
   modifying, by the first user, a datum of the selected profile; and
   automatically updating the second user of the modified datum.

19. The method of claim 16, wherein the user data comprises at least one of a name, a title, a company, an availability status, an account picture, a phone number, a mobile phone number, a mailing address, an email address, a facsimile number, a social media link, a website, a birthday, or an anniversary.

20. The method of claim 16, wherein sharing the selected profile with the second user comprises:
   on a condition that the selected profile is private:
     setting, in response to third instructions from the first user, the selected profile to public; and
     automatically sharing, without the explicit action by the first user, the selected profile with the second user.

21. The method of claim 16, further comprising:
   identifying the second user in response to enabling a proximity sensor of a device of the first user.

22. The method of claim 21,
wherein the selected profile is a public profile, and
wherein sharing the selected profile with the second user comprises:
   automatically sharing, without a first explicit action by the first user, the selected profile with the second user.

23. The method of claim 21,
wherein the request from the second user comprises a request to exchange a third profile of the second user, the third profile being a public profile,
wherein the request received from the second user is automatically initiated, without a second explicit action of the second user in response to the third profile being public.

24. The method of claim 21, wherein in response to enabling the proximity sensor of the device of the first user comprises:
   identifying a plurality of users, wherein the plurality of users includes the second user; and
   displaying a list of the plurality of users in a graphical user interface of the device of the first user, wherein the list of the plurality of users is sorted based on proximity of a respective device of each of the plurality of users to the device of the first user.

25. A method for exchanging user data, comprising:
identifying, in response to enabling an interface component of a device of a user, potential nearby contacts, wherein identifying the potential nearby contacts comprises:
   in response to the user touching and holding the interface component, commencing detection of the potential nearby contacts;
   continuing to search for one or more of the potential nearby contacts while the user is holding the interface component; and
   in response to the user releasing the interface component, stopping searching and identifying the potential nearby contacts;
selecting a potential nearby contact of the potential nearby contacts;
in response to selecting the potential nearby contact, sending a request to the potential nearby contact to share at least a subset of user data of the user with the potential nearby contact; and
in response to the potential nearby contact accepting the request, setting the user as a contact of the potential nearby contact.

26. The method of claim 25, further comprising:
receiving, from the user, a cancellation request of the request; and
revoking the request so that the potential nearby contact cannot accept the request.

27. The method of claim 25, wherein selecting the potential nearby contact of the potential nearby contacts comprises:
   receiving, from the potential nearby contact, a first location; and
   identifying the potential nearby contact in a case that a second location of the device of the user matching the first location.

28. The method of claim 27,
wherein the first location is an address, and
wherein the second location is a geolocation that is proximate the first location.

29. The method of claim 25, further comprising:
displaying, on the device of the user, a map including location markers indicative of locations of at least some contacts of the user.

30. The method of claim 25, wherein in response to the potential nearby contact accepting the request, setting the user as the contact of the potential nearby contact comprises:
   in response to a profile of the potential nearby contact being a public profile, automatically accepting, without an explicit action by the nearby contact, the request.

31. A method of exchanging user data, comprising:
receiving, from a first user, a first profile, wherein the first profile is set was public;
receiving, from a second user, a second profile, wherein the second profile is set as public;
identifying the second user as a potential contact for the first user based on proximity of the second user to the first user by:
   generating, on a device of the first user, a user interface display including a detection activation toggle function and a status indicator for an automatic mode;
   receiving a command from the user to activate the automatic mode;
   activating, in response to the command, the automatic mode,
     wherein the command is one of a first command or a second command, wherein the first command indicates that the automatic mode is activated until the user deactivates the automatic mode, and wherein the second command indicates that the automatic mode is activated for a first period of time;

sending a request to a network server to search for user devices while the automatic mode is activated to identify potential contacts in response to user interface with the detection activation toggle function; and identifying the second user as the potential contact;

in response to the first profile being public, the second profile being public, and the proximity of the second user to the first user:

sending the first profile to the second user; and
sending the second profile to the first user.

\* \* \* \* \*